US011561606B2

(12) United States Patent
Imes et al.

(10) Patent No.: US 11,561,606 B2
(45) Date of Patent: Jan. 24, 2023

(54) SYSTEMS AND METHODS FOR REDUCING WI-FI STATION POWER (71) Applicant: Johnson Controls Technology Company, Auburn Hills, MI (US)

(72) Inventors: Ezra M Imes, West Allis, WI (US); Nicholas J. Schaf, Hartland, WI (US); Robert C. Hall, Jr., Brown Deer, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 682 days.

(21) Appl. No.: 16/198,484

(22) Filed: Nov. 21, 2018

(65) Prior Publication Data

US 2020/0159312 A1 May 21, 2020

(51) Int. Cl.
*G06F 1/26* (2006.01)
*G06F 1/32* (2019.01)
*G06F 1/3296* (2019.01)
*H04W 52/02* (2009.01)
*H04L 9/08* (2006.01)
*H04W 12/0433* (2021.01)
*H04W 84/12* (2009.01)

(52) U.S. Cl.
CPC .......... *G06F 1/3296* (2013.01); *H04L 9/0891* (2013.01); *H04W 12/0433* (2021.01); *H04W 52/0216* (2013.01); *H04W 84/12* (2013.01)

(58) Field of Classification Search
CPC ............ G06F 1/3296; H04W 12/0433; H04W 52/0216; H04W 84/12; H04L 9/0891
See application file for complete search history.

(56) References Cited

U.S. PATENT DOCUMENTS

| 2007/0249324 A1* | 10/2007 | Jou ...................... | H04W 12/041 455/411 |
| 2011/0029659 A1* | 2/2011 | Shah ....................... | H04L 12/12 709/224 |
| 2012/0143383 A1* | 6/2012 | Cooperrider ............ | H02J 3/381 700/295 |

FOREIGN PATENT DOCUMENTS

WO    WO-2017/120386    7/2017

OTHER PUBLICATIONS

Akin. "802.11i Authentication and Key Management". 2005. Certified Wireless Network Professional.*

(Continued)

*Primary Examiner* — Nitin C Patel
(74) *Attorney, Agent, or Firm* — Foley & Lardner LLP (57) ABSTRACT

A system for reducing power consumption in a wireless network includes a station (e.g., Wi-Fi sensor) and an access point in wireless communication with the station. The station has at least a low-power sleep mode and an active mode. The system can be configured to assign a static Internet Protocol (IP) address to the station and disable re-negotiation of an encryption key while the station is in sleep mode. The system can further be configured to force the station to communicate via 802.11g and to transmit data to a proxy service while in active mode before returning to sleep mode upon receiving a response from the proxy service. Further, an association timeout period associated with the station can be configured to be at least twice as long as a wake-up period associated with the station.

14 Claims, 8 Drawing Sheets

(56) References Cited

OTHER PUBLICATIONS

U.S. Appl. No. 15/999,263, filed Aug. 17, 2018, Trivelpiece et al.
U.S. Appl. No. 15/618,492, filed Jun. 9, 2017, Salsbury et al.
U.S. Appl. No. 15/619,203, filed Jun. 9, 2017, Alcala Perez et al.

* cited by examiner

PRIOR ART

SYSTEMS AND METHODS FOR REDUCING WI-FI STATION POWER

BACKGROUND

The present disclosure relates generally to Wi-Fi system configurations, and more particularly to reducing station power consumption within the Wi-Fi system.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, music, lighting, etc.) configured to facilitate monitoring and controlling the building space.

BMS devices can include both wired and wireless devices. For example, wireless sensors can communicate with controllers via a communication network. In some situations, communication networks can include Wi-Fi networks (e.g., for wireless local area networking with devices, based on the IEEE 802.11 standards). Wireless and/or battery powered devices can consume a significant amount of power in order to transmit and receive information over Wi-Fi.

SUMMARY OF THE INVENTION

One implementation of the present disclosure is a system for reducing power consumption in a wireless network. The system includes a station having at least a sleep mode and an active mode and assigned a static Internet Protocol (IP) address. The system further includes an access point in wireless communication with the station. Further, an encryption key is re-negotiated between the station and the access point at periodic intervals, and the system is configured to disable a re-negotiation of the encryption key while the station is in the sleep mode.

Another implementation of the present disclosure is method for reducing power consumption in a wireless network. The method includes configuring a station to wirelessly communicate with an access point and providing at least a sleep mode and an active mode associated with the station. The method further includes forcing the station to communicate via 802.11g, providing the station with a static internet protocol (IP) address, and setting a station default mode to the sleep mode. Communication via 802.11g reduces negotiations between the station and the access point.

Yet another implementation of the present disclosure is a system for reducing power consumption in a wireless network. The system includes a wireless device in wireless communication with an access point and configured to operate in at least a sleep mode and an active mode. The system further includes a proxy service configured to facilitate communication between the wireless device and a network destination. The wireless device is configured to transmit data via a broadcast message and the proxy service is configured to receive data from the broadcast message. The wireless device is further configured to transmit the broadcast message while in the active mode and return to the sleep mode upon receiving a response from the proxy service. The proxy service is configured to provide the transmitted data to the network destination and wait for a response from the network destination.

DETAILED DESCRIPTION

Overview

Referring generally to the FIGURES, systems and methods are described that can be used to minimize power consumption associated with devices in a Wi-Fi network, according to various embodiments. For example, in Wi-Fi networks including a large number of battery-powered sensors or other battery-powered devices, the systems and methods described herein can deliver extended battery life for such sensors or devices. The Wi-Fi network can be configured to use an extended association timeout period for connections between devices and wireless access points. The Wi-Fi network can also be configured to disable a re-keying process involving generating new encryption keys for certain devices on the network. The connected devices can also be configured to use static IP addresses, broadcast signals, and version 802.11g of the IEEE 802.11 standards. Further, a proxy service can be used as an intermediary between devices and an access point. Devices on the Wi-Fi network can accordingly be configured to remain in a sleep mode for longer periods of time than otherwise possible.

As used herein, the term "station" (STA) can be defined as a device that is configured to use the 802.11 protocol. For example, a station may be a laptop, a desktop PC, PDA, or a smartphone. An STA can be fixed, mobile or portable. Generally in wireless networking terminology, a station, wireless client and node are used interchangeably, with no strict distinction existing between these terms. A station can also be referred to as a transmitter or receiver based on its transmission characteristics.

As used herein, the term "access point" (AP) can be defined as a base station in a wireless LAN. Although there are other wireless technologies that use access points, the term generally refers to a Wi-Fi network. Access points (APs) are generally stand-alone devices that plug into an Ethernet switch or hub; however, access point functionality can also be built into a router.

As used herein, the term "sleep mode" (sometimes called standby or suspend mode), can be defined as a power-saving state that a device can enter when not in use. Generally, the device's state is maintained in RAM (random access memory). When the device enters sleep mode, power can be cut to any unneeded systems, while RAM receives just enough power to enable it to maintain data. Additionally, as used herein, the term "active mode" can be defined as a regular connected mode, where the device is actively transmitting or receiving data.

As used herein, the term "proxy service" can be defined as an intermediary role played by software or a dedicated device between an endpoint device and a client which is requesting the service. The proxy service can exist on the same device or on a separate server. The proxy service can enable the client to connect to a different server and can provide access to services like Web pages, connections, files, etc. Additionally, as used herein, the term "rekeying" can be defined as a process of changing the session key (the encryption key of an ongoing communication). Rekeying can be used to limit the amount of data encrypted with the same key.

Building HVAC Systems and Building Management Systems

Figure 1:
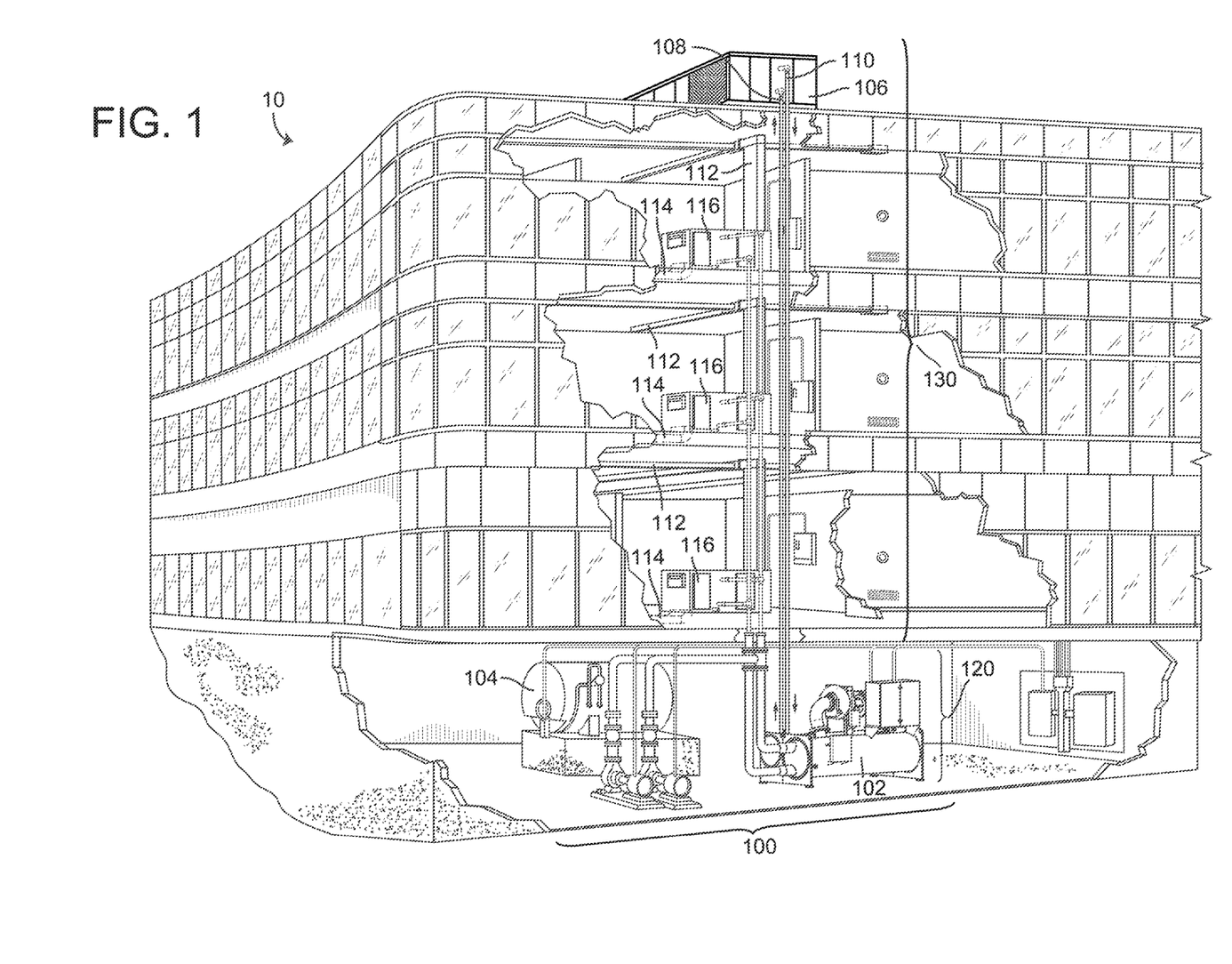
FIG. 1 is a drawing of a building equipped with a HVAC system, according to some embodiments.
Figure 2:
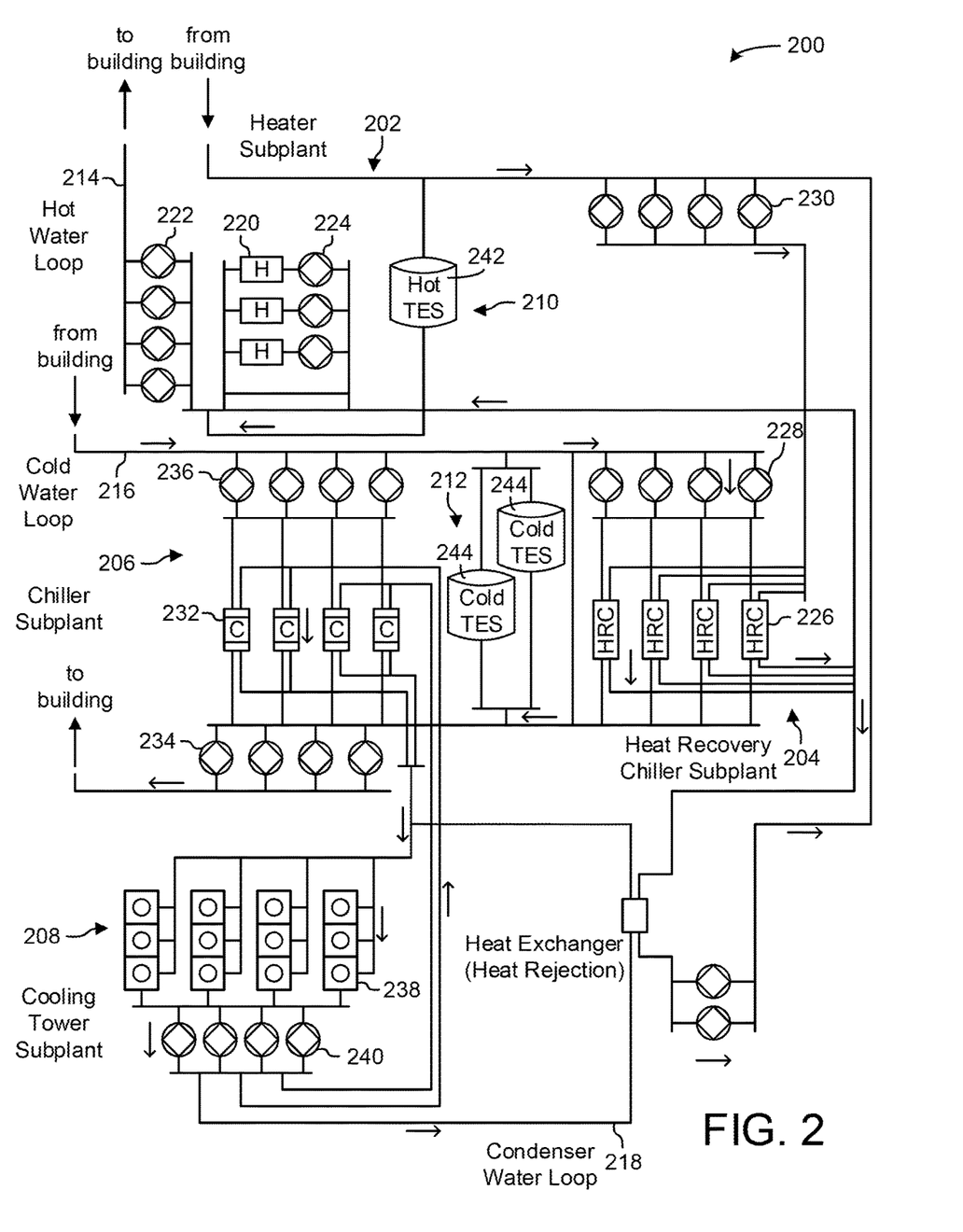
FIG. 2 is a block diagram of a waterside system which can be used to serve the building of FIG. 1, according to some embodiments.
Figure 3:
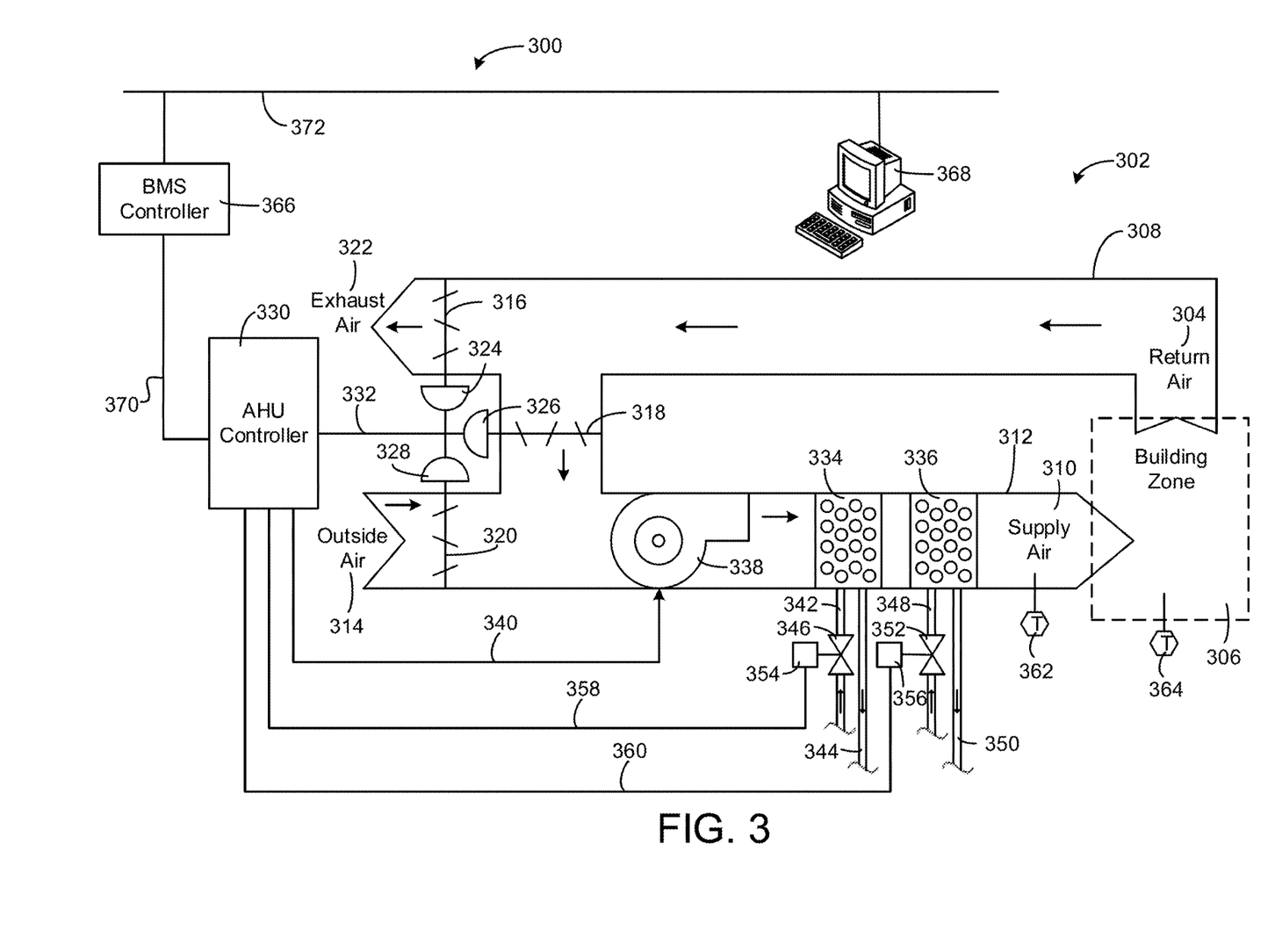
FIG. 3 is a block diagram of an airside system which can be used to serve the building of FIG. 1, according to some embodiments.
Figure 4:
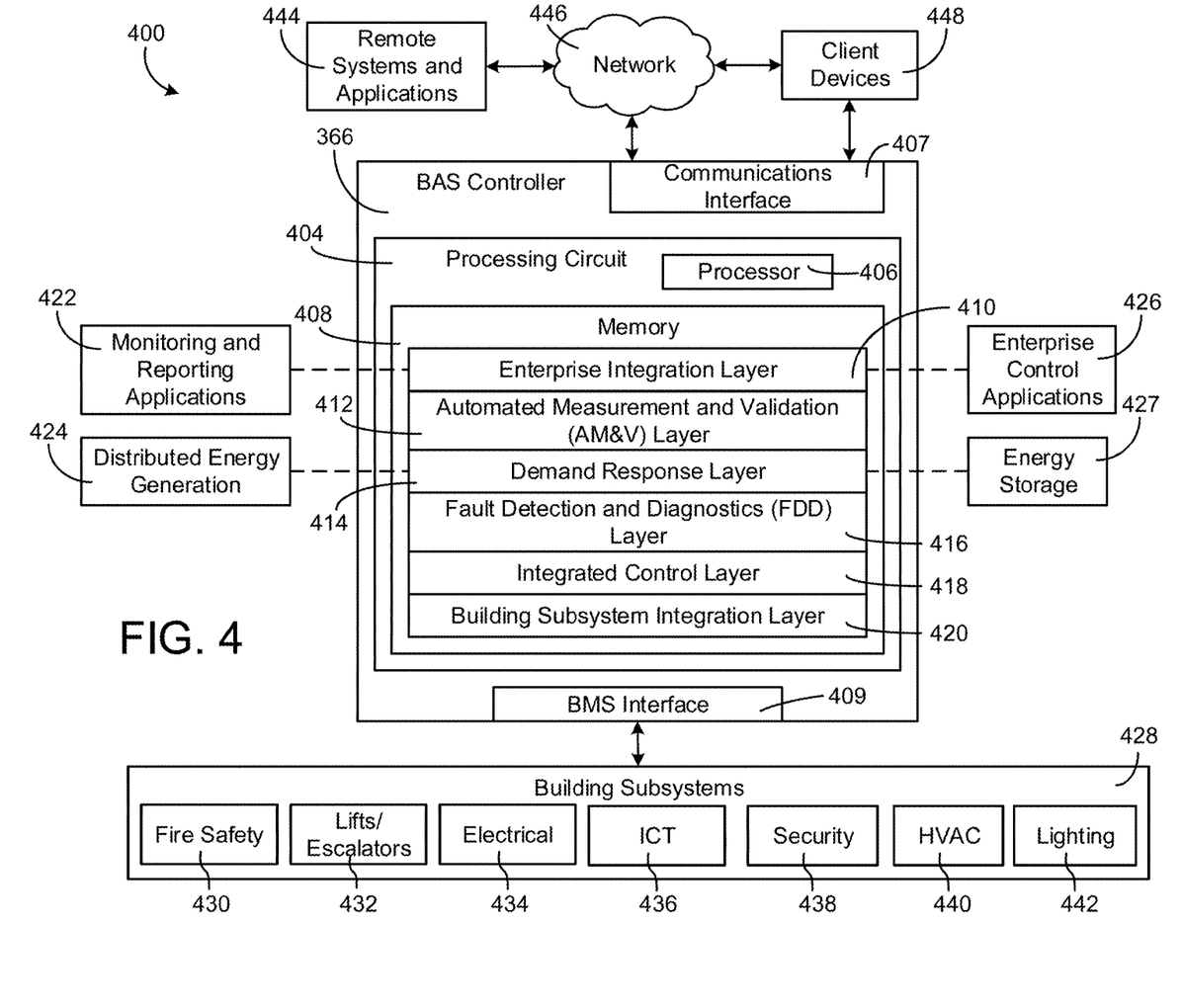
FIG. 4 is a block diagram of a building management system (BMS) which can be used to monitor and control the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a number of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a number of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a number of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a number of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a number of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a number of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and can correlate with the amount of energy consumed to achieve a desired supply air temperature. AHU 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a number of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a number of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a number of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Wi-Fi Station Power

Figure 5:
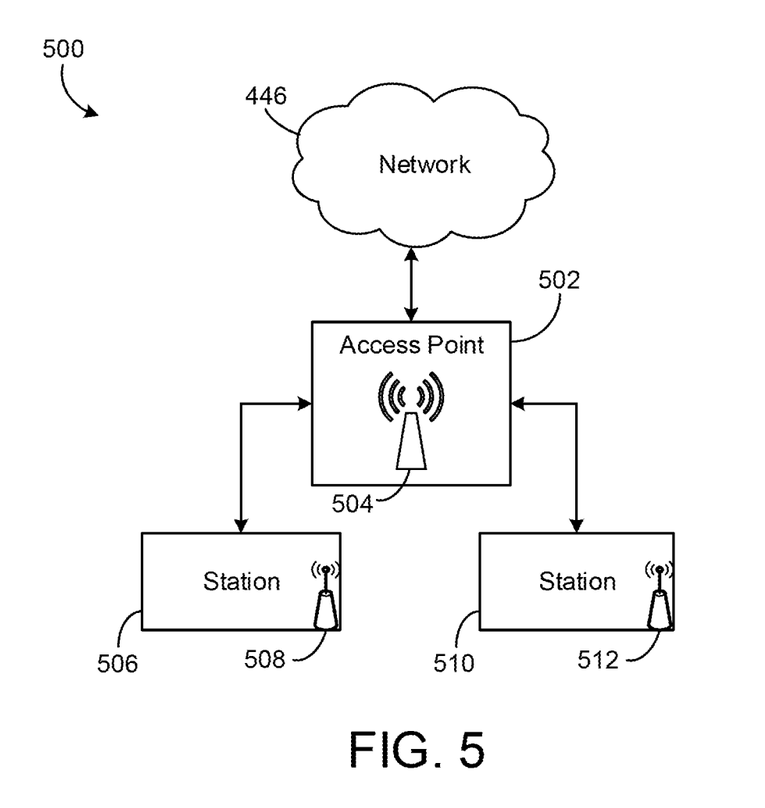
FIG. 5 is a block diagram of an example Wi-Fi network, according to some embodiments.

Referring now to FIG. 5, an example Wi-Fi system 500 is shown, according to some embodiments. System 500 is shown to include an access point 502 along with two stations: station 506 and station 510. In some embodiments, station 506 and station 510 are battery-powered devices configured to transmit data wirelessly to access point 502. For example, stations 506 and 510 can be Wi-Fi sensors configured to transmit measurements to access point 502. Access point 502 can then relay this information to a destination on network 446 (e.g., through a wired connection to a router). Station 506 is shown to include a wireless transmitter/receiver 508, station 510 is shown to include a wireless transmitter/receiver 512, and access point 502 is shown to include a wireless transmitter/receiver 504.

One approach to reducing power consumption associated with stations 506 and 510 involves strategically configuring association timeouts. After stations 506 and 510 have established a connection with access point 502, system 500 can be configured to terminate these connections after a predetermined period of time (i.e., the association timeout). For example, if station 506 establishes a connection with access point 502 but does not transmit any data to access point 502 for twenty minutes, then the connection between station 506 and access point 502 can be terminated. In some embodiments, access point 502 terminates this connection by removing a MAC address or other identifier associated with station 506 from a log of associated devices. In this example, if station 506 wants to transmit data to access point 502 again, the connection must be re-established. By extending the association timeout period, the amount of time and energy required to re-establish connections in this manner can be minimized since it is less likely the connection will be terminated in the first place.

Another approach to reducing power consumption associated with stations 506 and 510 involves configuring station 506 and station 510 such that they use a static IP address instead of a dynamic IP address. In some systems, a dynamic host configuration protocol (DHCP) can be used to "lease" IP addresses to various devices associated with a network. For example, a DHCP server (e.g., a component of a router) can be configured to receive an IP address from an Internet services provider (ISP) and then dynamically assign local IP addresses to devices connected to the local network. This process requires station 506 and station 510 to transmit multiple messages (e.g., discover, request) to the DHCP server and wait for multiple responses (e.g., offer, acknowledge) from the DHCP server to establish a leased IP address. Moreover, the leased IP address needs to be periodically renewed, thus requiring additional energy usage. However, this energy can be saved by configuring system 500 such that stations 506 and 510 use static IP addresses to communicate within network 446.

Another approach to reducing power consumption associated with stations 506 and 510 involves configuration of rekeying settings. For example, system 500 may abide by the Wi-Fi Protected Access (WPA) protocols such that stations 506 and 510 use encryption keys in order to be authenticated and granted access to network 446. In order to add an additional layer of security, system 500 can be configured to "rekey" at periodic intervals. For example, access point 502 can be configured to re-negotiate encryption keys associated with station 506 and station 510 every hour. However, system 500 can be configured such that this re-negotiation of encryption keys is disabled if station 506 or station 510 is in sleep mode. Accordingly, station 506 and station 510 can remain in sleep mode instead of "waking-up" and communicating with access point 502 to re-negotiate encryption keys. As such, station 506 and station 510 can conserve power.

Another approach to reducing power consumption associated with stations 506 and 510 involves forcing communication via 802.11g. This is a version of the IEEE 802.11 standards that uses a frequency band of about 2.4 GHz and has a throughput of about 54 megabits per second (Mb/s). This approach may seem counterintuitive because other versions of the IEEE 802.11 standards have faster transfer rates. For example, in some cases, version 802.11n can achieve a data transfer rate of about 72 Mb/s as compared to the 54 Mb/s rate associated with 802.11g. However, the 802.11n version requires additional handshaking that requires additional energy usage when compared to 802.11g.

Figure 6:
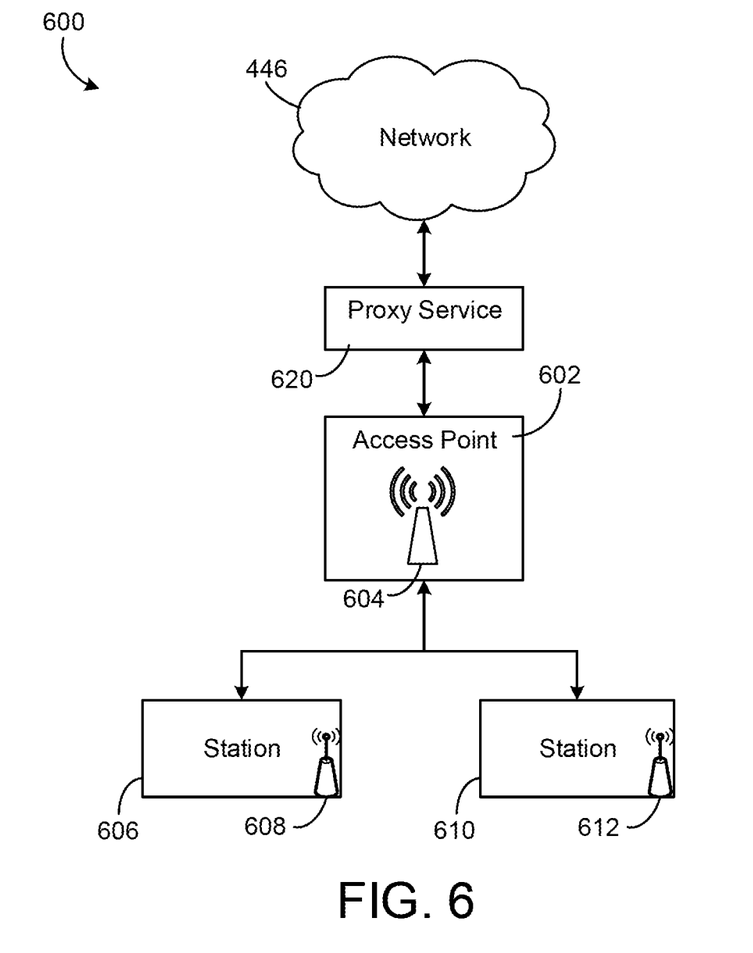
FIG. 6 is a block diagram of an example Wi-Fi network with a proxy service, according to some embodiments.

Referring now to FIG. 6, another example Wi-Fi system 600 is shown, according to some embodiments. Similar to system 500, system 600 is shown to include an access point 602 along with two stations: station 606 and station 610. However, in system 600, station 606 and station 610 communicate with a destination on network 446 through a proxy service 620. Station 606 is shown to include a wireless transmitter/receiver 608, station 610 is shown to include a wireless transmitter/receiver 612, and access point 602 is shown to include a wireless transmitter/receiver 604.

Proxy service 620 provides an intermediary such that station 606 and station 610 can be configured to transmit data to proxy service 620 instead of transmitting data to a destination on network 446. Proxy service 620 can be implemented in a variety of ways but in general can be described as a buffer that temporarily stores transmissions from station 606 and station 610. Proxy service 620 can then forward data from station 606 and station 610 to the appropriate destination on network 446 and wait for a reply back. In some embodiments, after proxy service 620 receives a transmission from station 606, for example, proxy service 620 sends a reply to station 606 indicating that the transmission has been received. As such, station 606 can then immediately return to sleep mode. Proxy service 620 can deliver significant energy savings for station 606 and station 610 since it can provide station 606 or station 610 with a "receipt" of a transmission faster than waiting for a response from a destination on network 446. It will be appreciated that access points, DHCP servers, and proxy services can be implemented within the same physical device (e.g., a router) or can be implemented in different physical devices.

Figure 7:
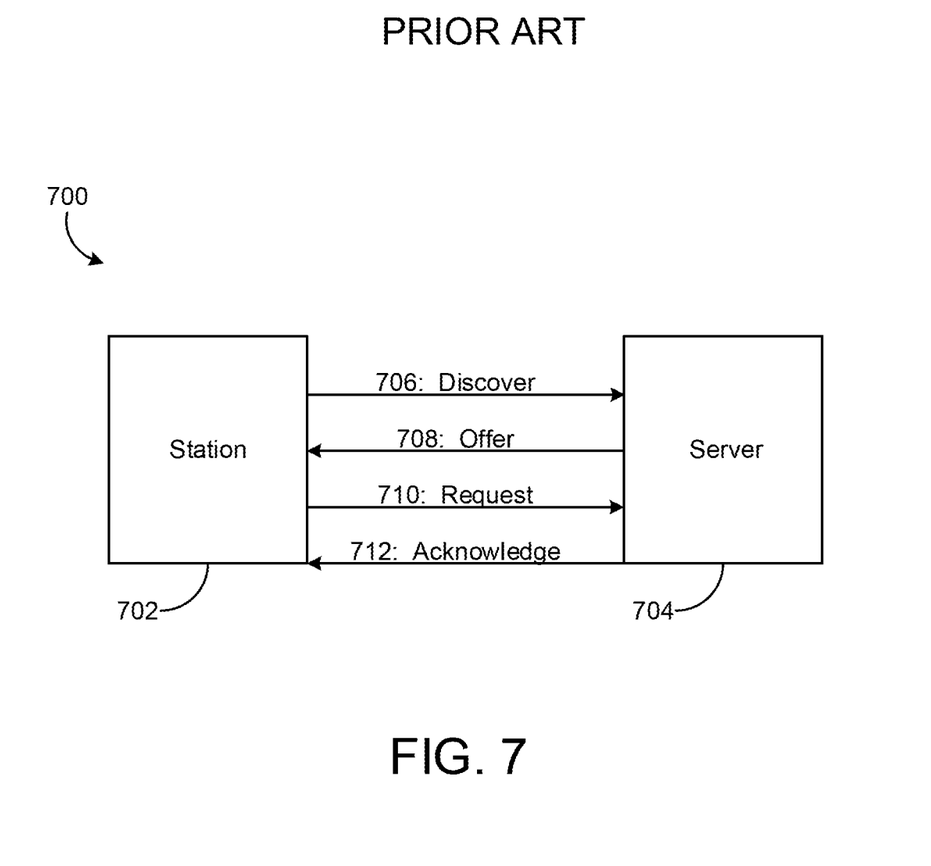
FIG. 7 is a block diagram of an example Wi-Fi network that uses dynamic IP addresses, according to some embodiments.

Referring now to FIG. 7, an example system 700 demonstrating a handshaking process associated with the "leasing" of IP addresses using DHCP known in the art is shown, according to some embodiments. System 700 includes both a station 702 and a DHCP server 704. In order to connect to the network, station 702 first broadcasts a discover message 706 that can be received by server 704. After receiving discover message 706, server 704 can then transmit an offer message 708 to station 702 that is essentially a lease offer that includes the IP address being offered to station 702. In response, station 702 transmits a request message 710 back to server 704. Message 710 indicates that station 702 has accepted the IP address offered in message 708. After receiving message 710, server 704 transmits an acknowledgement message 712 back to station 702 that that includes the lease duration and completes the handshaking process. As demonstrated in FIG. 7, a significant amount of communication is required in the case where station 702 is configured to use a dynamic IP address.

Figure 8:
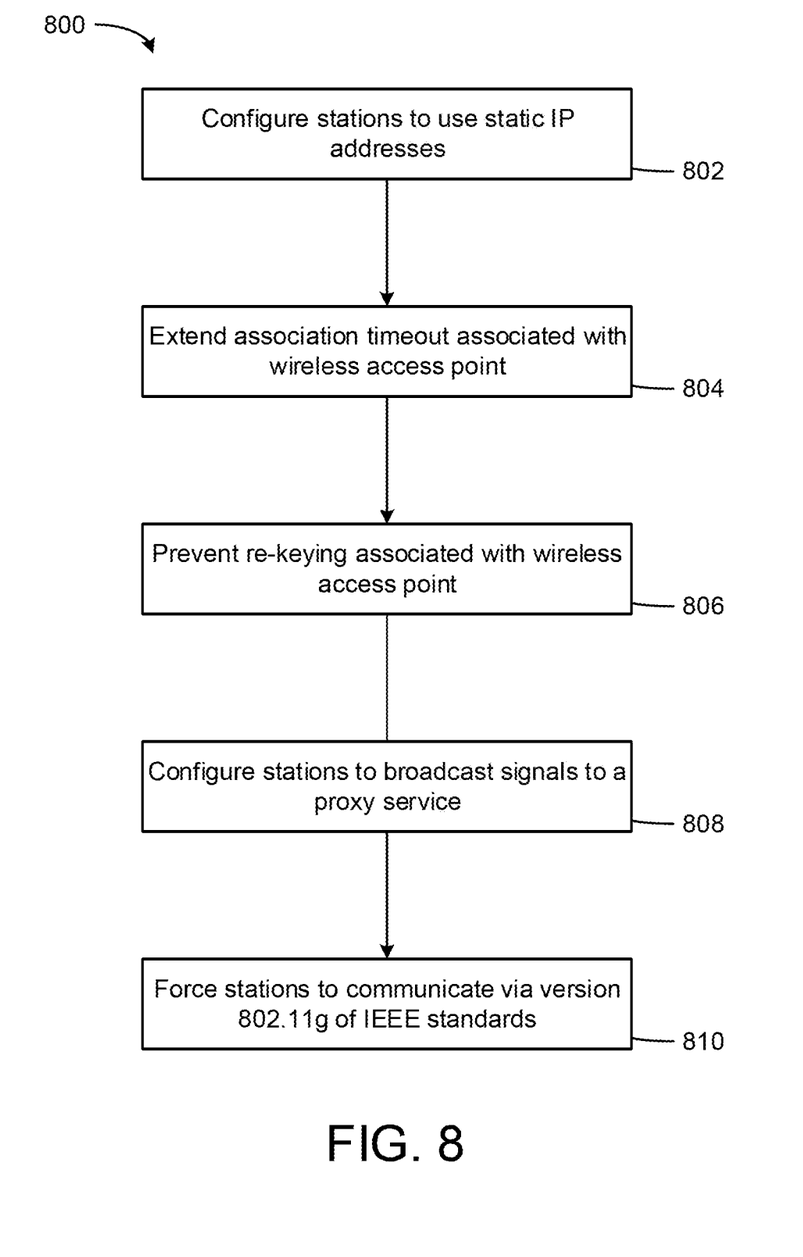
FIG. 8 is a flow diagram of an example process for optimizing power consumption in a Wi-Fi network, according to some embodiments.

Referring now to FIG. 8, a flow diagram of an example process 800 for minimizing station energy consumption in a Wi-Fi network is shown, according to some embodiments. Process 800 can deliver significant energy savings for devices such as Wi-Fi sensors and smart thermostat devices, for example. Especially in cases where these devices do not transmit large quantities of data, process 800 can be used to configure a Wi-Fi network such that the power consumption of connected devices is minimized. In some embodiments, the devices are powered by batteries, and thus process 800 can deliver extended battery life and reduce maintenance associated with the devices. While this disclosure refers primarily to BMS devices, it will be appreciated that the techniques described herein are applicable to a wide variety of wireless sensors and devices.

Process 800 is shown to include configuring stations such that they use static IP addresses as opposed to dynamic IP addresses (step 802). As described above, instead of using a protocol such as DHCP to "lease" IP addresses to stations within the network, a static IP address may instead be used to limit the number of transmissions required between stations and the network. As a result, the stations can remain in sleep mode instead of having to wake up and re-negotiate an IP address.

Process 800 is also shown to include extending an association timeout period associated with a wireless access point (step 804). As described above, an access point can be configured to terminate a connection with a station after a prolonged period of inactivity. For example, if the access point has not received any data from the station for an hour, then the access point can be configured to forget the station and remove it from a log of remembered devices. In some embodiments, the association timeout period can be extended to be at least twice as long as a wake-up period associated with a station. For example, a temperature sensor can be configured to exit sleep mode and transmit a temperature measurement to an access point every 28 minutes. In this example, the association timeout associated with the access point can be set to one hour such that two consecutive temperature measurements would need to be missed before the access point removes the association with the temperature sensor. As a result, the temperature sensor should not have to spend energy reconnecting to the access point and can remain in sleep mode for extended periods of time.

Process 800 is also shown to include preventing a re-keying process associated with the wireless access point (step 806). As discussed above, encryption keys can be used to authenticate devices on a wireless network. Rekeying can be used to improve network security but requires devices to exit sleep mode and communicate with an access point in order to establish a new encryption key. This rekeying process can be either be prevented entirely or can be prevented if a device is determined to be in sleep mode in order to conserve energy.

Process 800 is also shown to include configuring the stations such that they broadcast signals to a proxy service instead of to a destination on the network (step 808). By configuring devices to use broadcast messages, the need to wait for a reply before entering sleep mode can be eliminated. For example, under address resolution protocol (ARP), typically a match between a destination MAC address and a destination IP address needs to occur. Depending on the complexity of the network, the ARP process could take a significant amount of time and the stations may be required to remain in active mode until the process is completed. By using broadcast signals, the stations may not need to wait for a reply and thus the stations can return to sleep mode earlier, thereby saving power. Moreover, using a proxy service such as service 620 described above can shorten the path and time associated with station transmissions.

Process 800 is also shown to include forcing the stations to communicate using version 802.11g of the IEEE 802.11 standards (step 810). As discussed above, using version 802.11g may seem counterintuitive because alternative versions can achieve faster transfer rates. However, version 802.11g requires less handshaking and communication between stations and an access point. In cases where minimal quantities of data are being transferred, the difference in transfer rate becomes negligible and more energy can be saved as a result of fewer transmissions.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps can differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for reducing power consumption in a wireless network, the system comprising: a station having at least a sleep mode and an active mode; and an access point in wireless communication with the station; wherein an encryption key is re-negotiated between the station and the access point while the station is in the active mode, the system configured to disable a re-negotiation of the encryption key while the station is in the sleep mode, wherein the system is configured to enable and disable the re-negotiation of the encryption key without requiring a change in communication protocol.

2. The system of claim 1, wherein the station is powered at least in part by a battery, and wherein the station is configured to consume less power from the battery while in the sleep mode.

3. The system of claim 1, wherein the station comprises a thermostat device, a temperature sensor, a pressure sensor, a lighting sensor, an occupancy sensor, an air quality sensor, or a flow sensor.

4. The system of claim 1, wherein an association timeout period associated with the station and the access point is at least twice as long as a wake-up period associated with the station.

5. The system of claim 1, wherein the station is configured to transmit data via a broadcast message, and wherein a proxy service is configured to receive data from the broadcast message.

6. The system of claim 5, wherein the station is configured to transmit data to the proxy service while in the active mode and return to the sleep mode upon receiving a response from the proxy service, the proxy service configured to provide the transmitted data to a network destination and wait for a response from the network destination.

7. The system of claim 1, wherein the station is forced to communicate via 802.11g, thereby reducing negotiations between the station and the access point.

8. The system of claim 1, wherein the station is assigned a static Internet Protocol (IP) address.

9. A system for reducing power consumption in a wireless network, the system comprising: a station in wireless communication with an access point and configured to operate in at least a sleep mode and an active mode; wherein the station is configured to transmit data via a broadcast message to the access point, such that the station transmits the broadcast message while in the active mode and automatically returns to the sleep mode without waiting for a response to the broadcast message; and wherein an encryption key is re-negotiated between the station and the access point while the station is in the active mode, the system configured to disable a re-negotiation of the encryption key while the station is in the sleep mode, wherein the system is configured to enable and disable the re-negotiation of the encryption key without requiring a change in communication protocol.

10. The system of claim 9, wherein the station is powered at least in part by a battery, and wherein the station is configured to consume less power from the battery while in the sleep mode.

11. The system of claim 9, wherein the station comprises a thermostat device, a temperature sensor, a pressure sensor, a lighting sensor, an occupancy sensor, an air quality sensor, or a flow sensor.

12. The system of claim 9, wherein the station is forced to communicate via 802.11g, thereby reducing negotiations between the station and the access point.

13. The system of claim 9, wherein an association timeout period associated with the station and the access point is at least twice as long as a wake-up period associated with the station.

14. The system of claim 9, wherein the station is assigned a static Internet Protocol (IP) address.

* * * * *